United States Patent Office 3,092,623
Patented June 4, 1963

3,092,623
[3,2-c]PYRAZOLO-4,9-ANDROSTADIENES
Ralph F. Hirschmann, Scotch Plains, N.J., assignor to Merck & Co., Inc., Rahway, N.J., a corporation of New Jersey
No Drawing. Filed Dec. 1, 1961, Ser. No. 156,469
18 Claims. (Cl. 260—239.5)

This invention is concerned with novel steroid compounds and to processes of preparing the same. More particularly, it relates to novel [3,2-c]pyrazolo-4,9-androstadiene compounds.

This is a continuation-in-part of copending application Serial No. 88,658, filed February 13, 1961, now abandoned.

These novel 4,9-androstadieno-[3,2-c]pyrazole compounds, subject of the present invention, may be chemically represented by structures A and B:

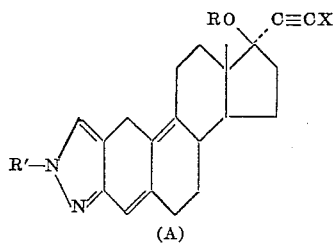

(A)

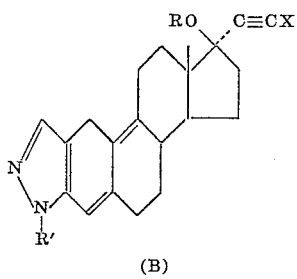

(B)

wherein X stands for hydrogen, halogen or the trifluoromethyl-group, R is hydrogen, alkyl or acyl and and R' is hydrogen, acyl, alkyl, cycloalkyl, or an aryl group derived from any aromatic nucleus.

The compounds prepared by my invention possess useful therapeutic properties as orally and parenterally active progestational agents and also as estrogenic agents. These compounds also lower cholesterol levels in the blood.

In preparing my novel chemical compounds, the starting material utilized is the 4,9-androstadiene-3-one having the formula:

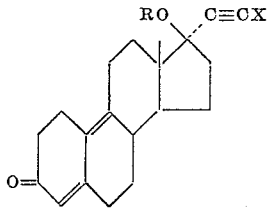

wherein X stands for hydrogen, halogen or the trifluoromethyl-group and R stands for hydrogen or alkyl.

The starting materials which are employed in the process of my invention include:

17α-ethynyl-17β-hydroxy-4,9-androstadiene-3-one,
17α-ethynyl-17β-methoxy-4,9-androstadiene-3-one,
17α-chloroethynyl-17β-methoxy-4,9-androstadiene-3-one,
17α-chloroethynyl-17β-hydroxy-4,9-androstadiene-3-one,
17α-bromoethynyl-17β-hydroxy-4,9-androstadiene-3-one,
17α-bromoethynyl-17β-methoxy-4,9-androstadiene-3-one,
17α-fluoroethynyl-17β-methoxy-4,9-androstadiene-3-one,
17α-fluoroethynyl-17β-hydroxy-4,9-androstadiene-3-one,
17α-trifluoropropynyl-17β-hydroxy-4,9-androstadiene-3-one, and
17α-trifluoropropynyl-17β-methoxy-4,9-androstadiene-3-one.

The 17β-alkoxy-4,9-androstadiene-3-one compounds used as starting material can be prepared by reaction of the 17β-hydroxy compound with an alkyl halide and silver oxide in a solvent such as dimethylformamide. The alkyl halides which may be used for this purpose include methyl iodide, ethyl iodide, n-propyl iodide, n-butyl iodide and the like.

The above 4,9-androstadiene-3-one compound are reacted with an alkyl formate and sodium hydride in an inert atmosphere to form the corresponding 2-hydroxymethylene-derivative which has the following structure:

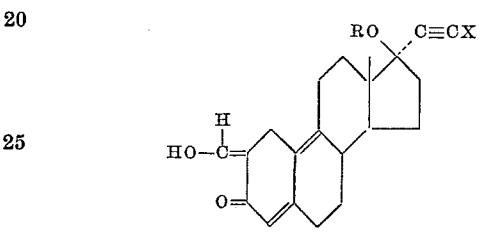

wherein X stands for hydrogen, halogen or the trifluoromethyl group and R represents hydrogen or alkyl.

The above 2-hydroxymethylene-4,9-androstadiene-3-one compound reacts with hydrazine in an inert atmosphere to form the corresponding 4,9-androstadieno-[3,2-c]pyrazole.

Upon treatment of a 2-hydroxymethylene-4,9-androstadiene-3-one compound with a lower alkanol in the presence of an acidic reagent such as p-toluenesulfonic acid the corresponding 2-alkoxymethylene-4,9-androstadiene-3-one is formed.

When the 2-alkoxymethylene-4,9-androstadiene-3-one is reacted with a monosubstituted hydrazine, the corresponding N-substituted-4,9-androstadieno-[3,2-c]pyrazole compounds are formed. The N-substituted-4,9-androstadieno-[3,2-c]pyrazoles having structure "A" are designated as the 1'-substituted 4,9-androstadieno-[3,2-c] pyrazoles, and the N-substituted pyrazole compounds having structure "B" are designated as the 2'-substituted-4,9-androstadieno-[3,2-c]pyrazoles.

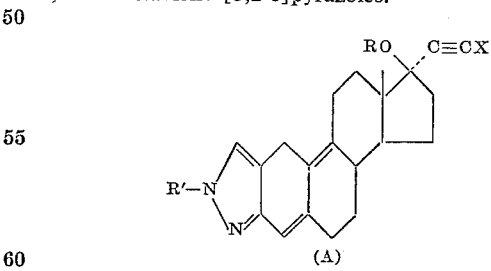

(A)

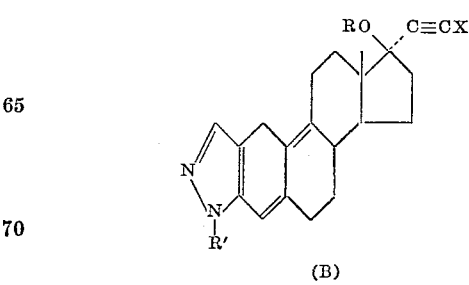

(B)

Upon treatment of a 2-hydroxymethylene-4,9-androstadiene-3-one compound directly with a monosubstituted arylhydrazine, without the intermediate formation of the 2-alkoxymethylene-derivative, one isomer is generally formed in preponderant amounts, whereas when reacting the 2-alkoxymethylene-4,9-androstadiene-3-one compound with a monosubstituted arylhydrazine, significant amounts of both isomers are obtained. When these reactions take place with monosubstituted-alkylhydrazines, mixtures may be obtained when starting with the 2-hydroxymethylenesteroid as well as with the 2-alkoxymethylene-steroid. A mixture of isomers may also result from the reaction of a monosubstituted hydrazine with a 2-hydroxymethylene-compound which possibly contains variable amounts of the 2-alkoxymethylene-derivative due to the operating procedures employed, for example, due to recrystallization in the presence of a trace of alcohol a solution of the 2-hydroxymethylene-compound from which acid has not been completely removed.

Among the monosubstituted hydrazines which may be used for the process of our invention are: alkylhydrazines, such as methylhydrazine, ethylhydrazine, propylhydrazines, butylhydrazines, β-hydroxyethylhydrazine, cycloalkylhydrazines; arylhydrazines including phenylhydrazine and the substituted phenylhydrazines, such as o-, m-, and p-halophenylhydrazines, o-, m-, and p-tolylhydrazines, o-, m-, and p-alkoxy-penhylhydrazines, o-, m-, and p-nitrophenylhydrazines, 1-hydrazinonaphthalene, 2-hydrazinopyridine, 3-hydrazinopyridine, 4-hydrazinopyridine, 4-hydrazinopyridine oxide, and 2-hydrazinopyrimidine; aralkylhydrazines, such as benzylhydrazine and phenylethylenehydrazine.

There are thus produced the corresponding N-substituted-4,9-androstadieno-[3,2-c]pyrazoles including: N-alkyl such as N-methyl-, N-ethyl-, N-butyl-, N-propyl-, N-(β-hydroxyethyl)-; N-cycloalkyl-, N-aryl- which may be derived from any aromatic nucleus, including N-phenyl- and the N-substituted-phenyl derivatives such as o-, m-, and p-halophenyl; o-, m-, and p-tolyl-; o-, m-, and p-alkoxyphenyl-, o-, m-, and p-nitrophenyl-; N-(1″-naphthyl)-, N-(2″-pyridyl)-, N-(3″-pyridyl)-, N-(4″-pyridyl)-, N-(4″-pyridyloxide)-, N-(2″-pyrimidyl)-; N-aralkyl-, such as N-benzyl- and N-phenylethenyl-4,9-androstadieno-[3,2-c]pyrazoles.

The N-alkyl-4,9-androstadieno-[3,2-c]pyrazoles may also be prepared by direct alkylation of the N-unsubstituted-4,9-androstadieno-[3,2-c]pyrazoles.

The compounds of our invention include, among others, the following: 17α-ethynyl-17β-hydroxy-4,9-androstadieno-[3,2-c]pyrazole, 17α-chloroethynyl-17β-hydroxy-4,9-androstadieno-[3,2-c]pyrazole, 17α-bromoethynyl-17β-hydroxy-4,9-androstadieno-[3,2-c]pyrazole, 17α-flouroethynyl -17β- hydroxy-4,9-androstadieno-[3,2-c]pyrazole, and the 17α-trifluoropropynyl-17β-hydroxy-4,9-androstadieno-[3,2-c]pyrazole.

This invention also includes the 17β-alkoxy-ethers and the 17βalkanoyl-esters of the above named compounds, as well as the 1′- and 2′-alkyl-, the 1′- and 2′-cycoalkyl-, the 1′ and 2′-aryl-, and the 1′ and 2′-aralkyl-derivatives of all of the above 17β-hydroxy-, 17β-alkoxy-ethers and 17β-alkanoyl-esters of these compounds.

The 17β-hydroxy-[3,2-c]pyrazolo-4,9-androstadiene-3-one compounds may be converted into 17β-alkanoyl esters by reaction with an alkanoic acid anhydride or alkanoyl halide in the presence of a tertiary amine such as pyridine. The acid anhydrides which may be used for this purpose include acetic anhydride, propionic anhydride, butyric anhydride and the like. The 17β-caproate is prepared by the reaction of the 17β-free alcohol with caproyl halide in the presence of a tertiary amine base.

The following examples illustrate methods of carrying out the present invention, but it is to be understood that these examples are given for purposes of illustration and not of limitation.

Example 1

A suspension of 610 mg. of 17α-ethynyl-17β-hydroxy-4,9-androstadiene-3-one in 50 ml. of dry benzene is stirred in a nitrogen atmosphere with 1 ml. of ethyl formate and 450 mg. of a suspension of about 54% sodium hydride in mineral oil at room temperature for 19 hours. Stirring is continued for 2 more hours after the addition of 1 ml. of ethyl formate and 350 mg. of sodium hydride. The reaction mixture is chilled in an ice bath and acidified with an excess of an aqueous solution of sodium dihydrogen phosphate. The layers are separated and the aqueous phase is extracted with ether, with ethyl acetate and with methylene chloride. The combined organic layers are extracted with sodium bicarbonate to remove impurities. The product is then extracted into a 2% aqueous solution of sodium hydroxide. Acidification of the alkaline extracts with dilute hydrochloric acid gives a product which is taken up in methylene chloride. The solution is then filtered and evaporated to dryness to afford 17α-ethynyl-17β-hydroxy-2-hydroxymethylene-4,9-androstadiene-3-one.

A 25 mg. aliquot of 17α-ethynyl-17β-hydroxy-2-hydroxymethylene-4,9-androstadiene-3-one is dissolved in 0.6 ml. of ethanol. An 0.032 ml. aliquot of a reagent, prepared by dissolving 0.48 ml. of hydrazine hydrate in 0.96 ml. of ethanol, is added and the mixture is refluxed under nitrogen for 45 minutes. The volatiles are removed in vacuo and the residue is extracted with hot methylene chloride. The methylene chloride solution is filtered to remove insolubles and taken to dryness. The residue is flushed two times with n-hexane and dried to give 17α-ethynyl-17β-hydroxy-4,9-androstadieno-[3,2-c]pyrazole.

Example 2

A suspension of 610 mg. of 17α-chloroethynyl-17β-hydroxy-4,9-androstadiene-3-one in 50 ml. of dry benzene is stirred in a nitrogen atmosphere with 1 ml. of ethyl formate and 450 mg. of a suspension of about 54% sodium hydride in mineral oil at room temperature for 19 hours. Stirring is continued for 2 more hours after the addition of 1 ml. of ethyl formate and 350 mg. of sodium hydride. The reaction mixture is chilled in an ice-bath and acidified with an excess of an aqueous solution of sodium dihydrogen phosphate. The layers are separated and the aqueous phase is extracted with ether, with ethyl acetate and with methylene chloride. The combined organic layers are extracted with sodium bicarbonate to remove impurities. The product is then extracted into a 2% aqueous solution of sodium hydroxide. Acidification of the alkaline extracts with dilute hydrochloric acid gives a product which is taken up in methylene chloride. The solution is then filtered and evaporated to dryness to afford 17α-chloroethynyl-17β-hydroxy-2-hydroxymethylene-4,9-androstadiene-3-one.

A 25 mg. aliquot of 17α-chloroethynyl-17β-hydroxy-2-hydroxymethylene-4,9-androstadiene-3-one is dissolved in 0.6 ml. of ethanol. An 0.032 ml. aliquot of a reagent, prepared by dissolving 0.48 ml. of hydrazine hydrate in 0.96 ml. of ethanol, is added and the mixture is refluxed under nitrogen for 45 minutes. The volatiles are removed in vacuo and the residue is extracted with hot methylene chloride. The methylene chloride solution is filtered to remove insolubles and taken to dryness. The residue is flushed two times with n-hexane and dried to give 17α-chloroethynyl-17β-hydroxy-4,9-androstadieno-[3,2-c]pyrazole.

In accordance with the above procedures, but starting with the 17α-bromoethynyl- or the 17α-fluoroethynyl-17β-hydroxy-4,9-androstadiene-3-one in place of the 17α-chloroethynyl-17β-hydroxy-4,9-androstadiene-3-one there is obtained the corresponding 17α-bromoethynyl- or the 17α-fluoroethynyl-17β-hydroxy-4,9-androstadieno-[3,2-c]pyrazole.

The starting materials can be prepared by the following procedures: A solution consisting of 1.7 g. (1.32 cc.) of cis-1,2-dichloroethylene in 10 cc. of sodium dried ether is added over 0.5 hour at 0° C. to 3 cc. of a 1.4 N solution of methyl lithium (prepared by adding lithium to methyl iodide in dry ether solution under nitrogen at about 10° C.) in 25 cc. of sodium dried ether. The reaction mixture is stirred at room temperature under nitrogen for an additional 1½ hours, followed by the addition over a 15-minute period of 100 mg. of 3-methoxy-2,5(10)-androstadiene-17-one in 4 cc. of sodium dried ether. The mixture is left stirring at room temperature overnight, poured into ice water and extracted with ether. The ether extracts are washed with water, dried over sodium sulfate and concentrated in vacuo. The residue is chromatographed on 10 g. of basic alumina. The product is eluted with petroleum ether:ether 8:2. Crystallization from acid-free methanol affords 48 mg. of 17α-chloroethynyl - 3 - methoxy - 2,5(10) - androstadiene-17β-ol, M.P. 80–85° C.

I.R. $\lambda_{max}^{Nujol}$ 2.80, 4.48, 6.02, 6.12μ

In accordance with the above procedures, but using 1,2-dibromoethylene in place of 1,2-dichloroethylene, there is obtained the 17α-bromoethynyl-3-methoxy-2,5(10)-androstadiene-17β-ol.

In accordance with the above procedures, but using 1-chloro-2-fluoroethylene in place of 1,2-dichloroethylene, there is obtained a mixture of the 17α-chloroethynyl- and the 17α-fluoroethynyl-3-methoxy-2,5(10)-androstadiene-17β-ol, which compounds are separated by chromatography.

To a solution of 160 mg. of 17α-chloroethynyl-3-methoxy-2,5(10)-androstadiene-17β-ol in 1.6 cc. of dioxane and 7.2 cc. of absolute ethanol is added 3.2 cc. of glacial acetic acid, and immediately thereafter 1.6 cc. of water. This reaction mixture is left standing at room temperature for 5 hours. It is then poured into an ice-sodium bicarbonate solution, allowed to stand until the mixture is basic and extracted with benzene. The benzene extracts are washed with water until the washings are only slightly basic and then dried over anhydrous potassium carbonate, filtered and concentrated in vacuo using a water bath at 30–50° C. By crystallization from ether, about 90 mg. of 17α-chloroethynyl-17β-hydroxy-5(10)-androstene-3-one is obtained. U.V. no max;

I.R. $\lambda_{max}^{Nujol}$ 2.98, 4.50, 5.90μ

To 100 mg. of 17α-chloroethynyl-17β-hydroxy-5(10)-androstene-3-one in 5 cc. of pyridine is added one equivalent of bromine. The reaction is stirred for two hours at room temperature, poured into ice-water and extracted with ether. The ether extract is washed with water, dried over sodium sulfate, and concentrated in vacuo to yield 17α-chloroethynyl-17β-hydroxy-4,9-androstadiene-3-one.

In accordance with the above procedures, but starting with the 17α-bromoethynyl- or the 17α-fluoroethynyl-3-methoxy-2,5(10)-androstadiene-17β-ol in place of the 17α - chloroethynyl - 3 - methoxy - 2,5(10) - androstadiene-17β-ol, there is obtained the corresponding 17α-bromoethynyl- or the 17α-fluoroethynyl-17β-hydroxy-4,9-androstadiene-3-one.

*Example 3*

A suspension of 610 mg. of 17α-trifluoropropynyl-17β-hydroxy-4,9-androstadiene-3-one in 50 ml. of dry benzene is stirred in a nitrogen atmosphere with 1 ml. of ethyl formate and 450 mg. of a suspension of about 54% sodium hydride in mineral oil at room temperature for 19 hours. Stirring is continued for 2 more hours after the addition of 1 ml. of ethyl formate and 350 mg. of sodium hydride. The reaction mixture is chilled in an ice-bath and acidified with an excess of an aqueous solution of sodium dihydrogen phosphate. The layers are separated and the aqueous phase is extracted with ether, with ethyl acetate and with methylene chloride. The combined organic layers are extracted with sodium bicarbonate to remove impurities. The product is then extracted into a 2% aqueous solution of sodium hydroxide. Acidification of the alkaline extracts with dilute hydrochloric acid gives a product which is taken up in methylene chloride. The solution is then filtered and evaporated to dryness to afford 17α-trifluoropropynyl-17β-hydroxy-2-hydroxymethylene-4,9-androstadiene-3-one.

A 25 mg. aliquot of 17α-trifluoropropynyl-17β-hydroxy-2-hydroxymethylene-4,9-androstadiene-3-one is dissolved in 0.6 ml. of ethanol. An 0.32 ml. aliquot of a reagent, prepared by dissolving 0.48 ml. of hydrazine hydrate in 0.96 ml. of ethanol, is added and the mixture is refluxed under nitrogen for 45 minutes. The volatiles are removed in vacuo and the residue is extracted with hot methylene chloride. The methylene chloride solution is filtered to remove insolubles and taken to dryness. The residue is flushed two times with n-hexane and dried to give 17α-trifluoropropynyl-17β-hydroxy-4,9-androstadieno-[3,2-c]pyrazole.

One hundred mg. of 17α-trifluoropropynyl-17β-hydroxy-4,9-androstadieno-[3,2-c]pyrazole is heated with 2 cc. of acetic anhydride and 1.2 cc. of pyridine on the steam bath overnight. The reaction mixture is then poured onto ice and extracted with chloroform. The extract is washed with water and concentrated. The concentrate is chromatographed over acid-washed alumina and eluted with mixtures of ether and petroleum ether to give as a major product N'-acetyl-17β-acetoxy-17α-trifluoropropynyl-4,9-androstadieno-[3,2-c]pyrazole.

The 17α-trifluoropropynyl-17β-hydroxy-4,9-androstadiene-3-one used as starting material can be prepared by the following procedures:

A 50 cc. three-neck round bottom flask is fitted with a Dry Ice condenser, a dropping funnel and a magnetic stirrer. After the addition of 210 mg. of magnesium, the entire system is swept with nitrogen and flame dried. Five cc. of dry ether is added to the magnesium and 1 cc. of ethyl bromide in 5 cc. of ether is added dropwise with stirring over 15 minutes. After all the magnesium has reacted, 5 cc. of trifluoropropyne (prepared by the reaction of propiolic acid with sulfur tetrafluoride) is distilled into the reaction mixture and the mixture is maintained under reflux for one hour using a Dry Ice-acetone condenser. The reaction is then allowed to warm to room temperature, the excess gaseous trifluoropropyne being distilled off. A solution of 500 mg. of 3-methoxy-2,5(10)-androstadiene-17-one which is dried by azeotropic distillation from benzene, is added in 5 cc. of benzene and 5 cc. of dry ether. The reaction mixture is stirred for 16 hours at room temperature. Water is then added and the mixture extracted with ether. The organic extracts are washed with water until the washings are weakly basic, dried over sodium sulfate and concentrated in vacuo. The residue is chromatographed on 20 g. of basic alumina, by charging with petroleum ether and eluting with a mixture of 8 parts petroleum ether and 2 parts ether to give 410 mg. of 17α-trifluoropropynyl-3-methoxy-2,5(10)-androstadiene-17β-ol.

To 410 mg. of 17α-trifluoropropynyl-3-methoxy-2,5(10)-androstadiene-17β-ol in 4.1 cc. of dioxane and 18.45 cc. of absolute ethanol is added 8.2 cc. of glacial acetic acid in 4.1 cc. of water. This reaction mixture is left stirring at room temperature for 5 hours. It is then poured into an ice-sodium bicarbonate solution and extracted with benzene. The benzene extract is washed with water until the washings are just slightly basic, dried over sodium sulfate and concentrated in vacuo. The crude product (344 mg.) is chromatographed on 13 g. of neutral (ethyl acetate washed) alumina by charging with a mixture of 1 part benzene and 1 part petroleum ether, and eluting with mixtures of 8 parts petroleum ether:2 parts ether and 7 parts petroleum ether:3 parts ether. Recrystallization from a mixture of ether-petroleum ether affords 167 mg. of 17α-trifluoropropynyl-17β-hydroxy-19-nor-5(10)-androstene-3-one, M.P. 137–140° C.

I.R. $\lambda_{max}^{KBr}$ 2.92, 4.51, 5.8–5.85, 6.01, 7.85, 8.6–8.85μ

$[\alpha]_D^{27°\,C.}$ +10.1, dioxane C, 1.0. Calculated for $$C_{21}H_{25}O_2F_3:$$

C, 68.85; H, 6.88; F, 15.56. Found: C, 68.77; H, 7.00; F, 17.3.

To 100 mg. of 17α-trifluoropropynyl-17β-hydroxy-5(10)-androstene-3-one in 5 cc. of pyridine is added one equivalent of bromine. The reaction is stirred for two hours at room temperature, poured into ice-water and extracted with ether. The ether extract is washed with water, dried over sodium sulfate, and concentrated in vacuo to yield 17α-trifluoropropynyl-17β-hydroxy-4,9-androstadiene-3-one.

*Example 4*

To a solution of 0.5 millimole of 17α-ethynyl-17β-hydroxy-2-hydroxymethylene-4,9-androstadiene-3-one in about 3 ml. of absolute ethanol is added 0.6 millimole of sodium acetate and then 0.6 millimole of methylhydrazine sulfate. The mixture is refluxed under nitrogen for 40 minutes and then filtered hot. The filtrate is taken to dryness, water is added, and the product which is preponderantly the 17α-ethynyl-17β-hydroxy-N'-methyl-4,9-androstadieno-[3,2-c]pyrazole is removed by filtration.

Alternately, the 17α-ethynyl-17β-hydroxy-N'-methyl-4,9-androstadieno-[3,2-c]pyrazole may be prepared by the following procedure: A solution of about 0.47 millimole of 17α-ethynyl-17β-hydroxy-4,9-androstadieno-[3,2-c]pyrazole-17β-ol in 10 ml. of benzene and about 30–38 mg. of about 51% sodium hydride (in oil suspension) after the addition of 2–3 ml. of dimethylformamide (dried over calcium hydride) and 5 ml. of methyl iodide, the mixture is stirred at room temperature overnight. The product is filtered, washed with methylene chloride, and the filtrate and washings are taken to dryness. The residue is treated with water and the product is filtered to give 17α--ethynyl-17β-hydroxy-N-methyl-4,9-androstadieno-[3,2-c]pyrazole.

In accordance with the above procedures, but using other alkylating agents in place of methyl iodide, there are obtained the corresponding N-alkyl-17β-hydroxy 4,9-androstadieno-[3,2-c]pyrazole.

*Example 5*

To 200 mg. of 17α-ethynyl-17β-hydroxy-2-hydroxymethylene-4,9-androstadiene-3-one in 7 cc. of absolute ethanol is added 82 mg. of sodium acetate and then 102 gms. of cyclohexylhydrazine oxalate. The mixture is refluxed under nitrogen for one hour. The insolubles are removed by filtration. The filtrate is taken to dryness. The residue is dissolved in 3 cc. of ether and the ether solution is washed successively with 2% aqueous sodium hydroxide and then with water to neutrality. The ether solution is then dried over magnesium sulfate, filtered and taken to dryness to give N-cyclohexyl-17α-ethynyl-17β-hydroxy-4,9-androstadieno-[3,2-c]pyrazole.

*Example 6*

A mixture of 90 mg. of 17α-ethynyl-17β-hydroxy-2-hydroxymethylene-4,9-androstadiene-3-one, and 0.028 ml. of phenylhydrazine are refluxed under nitrogen in 1.2 ml. of absolute ethanol for about 50 minutes. The reaction mixture is taken to dryness. Water is added and the product is filtered to give an amorphous solid, which is washed successively with water, dilute acid, water, and petroleum ether. The product is crystallized from methanol to afford as a major component 17α-ethynyl-17β-hydroxy-2'-phenyl-4,9-androstadieno-[3,2-c]pyrazole.

In accordance with the above procedure, but using other arylhydrazines, for example, p-nitrophenylhydrazine, 1-hydrazinonaphthalene, 2-, 3-, or 4-hydrazinopyridine, 4-hydrazinopyridine oxide or 2-hydrazinopyrimidine, or the like, in place of phenylhydrazine, there is obtained predominantly the corresponding 2'-aryl-17β-ethynyl-4,9-androstadieno-[3,2-c]pyrazole.

*Example 7*

To a mixture of 223 mg. of 17α-chloroethynyl-17β-hydroxy-2-hydroxymethylene-4,9-androstadiene-3-one in 5 ml. of ethanol is added 49 mg. of sodium acetate and then 107 mg. of p-chlorophenylhydrazine hydrochloride. The mixture is refluxed under nitrogen for 50 minutes. The mixture is then taken to dryness, water is added, and the product is filtered to give an amorphous solid which is washed with water, dried and crystallized from methanol to give as a major component the 17α-chloroethynyl-17β-hydroxy-2'-(p-chlorophenyl)-4,9-androstadieno-[3,2-c]pyrazole.

*Example 8*

To 223 mg. of 17α-bromoethynyl-17β-hydroxy-2-hydroxymethylene-4,9-androstadiene-3-one in 3 ml. of absolute ethanol is added 49.2 mg. of sodium acetate, and then 105 mg. of p-methoxyphenylhydrazine hydrochloride. The reaction mixture is refluxed for 5 minutes at which time it turns dark. The product is filtered and taken to dryness. The residue is dissolved in ether, filtered, and then stirred with an equal weight of Darco G-60 (a decolorizing charcoal). The filtrate is reduced to a volume of 1 cc. Petroleum ether is added and the product is filtered off which is preponderantly the 17α-bromoethynyl-17β-hydroxy-2'-(p-methoxyphenyl)-4,9-androstadieno-[3,2-c]pyrazole.

*Example 9*

To a mixture of 223 mg. of 17α-trifluoropropynyl-17β-hydroxy-2-hydroxymethylene-4,9-androstadiene-3-one in 5 ml. of absolute ethanol is added 49 mg. of sodium acetate and then 95 mg. of p-tolylhydrazine hydrochloride. The mixture is refluxed under nitrogen for 45 minutes. On cooling, a solid precipitates which is filtered. The filtrate is taken to dryness and water is added. The product is filtered, washed with water, dilute acid, and again with water until neutral. The product is purified by dissolving 235 mg. of the crude material in 30 cc. of methanol and stirring at room temperature with 235 mg. of Nuchar G-1000-N (a decolorizing charcoal). The mixture is filtered and the filtrate is concentrated and then crystallized from a solvent to give as a major component the 17α-trifluoropropynyl-17β-hydroxy-2'-(p-tolyl)-4,9-androstadieno-[3,2-c]pyrazole.

*Example 10*

To 200 mg. of 17α-trifluoropropynyl-17β-hydroxy-2-hydroxymethylene-4,9-androstadiene-3-one in 7 cc. of absolute ethanol is added 82 mg. of sodium acetate and then 102 gms. of benzylhydrazine oxalate. The mixture is refluxed under nitrogen for one hour. The insolubles are removed by filtration. The filtrate is taken to dryness and the residue is dissolved in 3 cc. of ether. The ether solution is washed successively with 2% aqueous sodium hydroxide and then with water to neutrality. The ether solution is then dried over magnesium sulfate, filtered and then taken to dryness to afford N'-benzyl-17α-trifluoropropynyl-17β-hydroxy-4,9-androstadieno-[3,2-c]pyrazole.

*Example 11*

A suspension of 610 mg. of 17α-ethynyl-17β-methoxy-4,9-androstadiene-3-one in 50 ml. of dry benzene is stirred in a nitrogen atmosphere with 1 ml. of ethyl formate and 450 mg. of a suspension of about 54% sodium hydride in mineral oil at room temperature for 19 hours. Stirring is continued for 2 more hours after the addition of 1 ml. of ethyl formate and 350 mg. of sodium hydride. The reaction mixture is chilled in an ice bath and acidified with an excess of an aqueous solution of sodium dihydrogen phosphate. The layers are separated and the aqueous phase is extracted with ether, with ethyl acetate and with methylene chloride. The combined organic layers are extracted with sodium bicarbonate to remove impurities. The product is then extracted into a 2% aqueous solution of sodium hydroxide. Acidification of the alkaline extracts with dilute hydrochloric acid gives a product which is taken up in methylene chloride. The solution is filtered and evaporated to dryness, to give 17α-ethynyl - 2 - hydroxymethylene - 17β-methoxy-4,9-androstadiene-3-one.

A 25 mg. aliquot of 17α-ethynyl-2-hydroxymethylene-17β-methoxy-4,9-androstadiene-3-one is dissolved in 0.6 ml. of ethanol. An 0.032 ml. aliquot of a reagent, prepared by dissolving 0.48 ml. of hydrazine hydrate in 0.96 ml. of ethanol, is added and the mixture is refluxed under nitrogen for 45 minutes. The volatiles are removed in vacuo and the residue is extracted with hot methylene chloride. The methylene chloride solution is filtered to remove insolubles and taken to dryness. The residue is flushed two times with n-hexane and dried to give 17α-ethynyl-17β-methoxy-4,9-androstadieno-[3,2-c]pyrazole.

The starting material for the above reaction is prepared by the following procedure: A mixture of 500 mg. of 17α-ethynyl-17β-hydroxy-4,9-androstadiene-3-one, 10 ml. of dimethylformamide, 20 ml. of methyl iodide, and 1.5 gms. of silver oxide is stirred at room temperature for 4 days, an additional ½ gm. of silver oxide being added at the end of each day. One hundred ml. of chloroform is then added to the reaction mixture and the mixture is stirred for one hour and filtered. The filtrate is evaporated to dryness and the residual oil is chromatographed over acid-washed alumina and eluted with mixtures of ether and petroleum ether to give 17α-ethynyl-17β-methoxy-4,9-androstadiene-3-one.

*Example 12*

To a solution of 100 mg. of 17α-trifluoropropynyl-17β-hydroxy-4,9-androstadieno-[3,2-c]pyrazole in 2 ml. of pyridine is added two milliequivalents of acetic anhydride. The mixture is allowed to stand overnight at room temperature. A mixture of ice and water is then added. After standing for about 30 minutes, the product is extracted with ethyl acetate. The ethyl acetate extract is washed successively with water, ice-cold 1 N sulfuric acid (until the pH of the aqueous layer is 1–3), saturated aqueous sodium bicarbonate (until the pH of the aqueous layer is 8), and water (until the aqueous layer is neutral). The ethyl acetate solution is dried with anhydrous sodium sulfate. The solvent is then distilled at about 40° C. in vacuo to afford as the major component the N'-acetyl-17β - acetoxy-17α-trifluoropropynyl-4,9-androstadieno-[3,2-c]pyrazole, which is isolated by the addition of water and filtration.

In accordance with the above procedure, but using an equivalent quantity of another acylating agent in place of acetic anhydride, there is obtained the corresponding N-acyl - 17β - acetoxy - 17α-trifluoropropynyl-4,9-androstadieno-[3,2-c]pyrazole.

*Example 13*

A 111.5 mg. sample of 17α-trifluoropropynyl-17β-hydroxy-2-hydroxymethylene - 4,9-androstadiene-3-one (see Example 3) is suspended in 2.5 ml. of ethanol and treated with 24.5 mg. of sodium acetate, followed with the addition of 48.5 mg. of p-fluorophenylhydrazine hydrochloride. The air in the system is replaced with nitrogen and the mixture is quickly brought to reflux temperature. After refluxing for one hour the mixture is taken to dryness. The residue is dissolved in ether, the ether layer is treated three times with 2.5 N hydrochloric acid, then three times with 2.5 N sodium hydroxide and finally with water. The ether layer is dried over magnesium sulfate, filtered and concentrated to dryness in vacuo. The product is dissolved in methanol and then allowed to crystallize slowly to afford as the major component 17β-hydroxy-17α-trifluoropropynyl - 2' - (p-fluorophenyl) - 4,9-androstadieno-[3,2-c]pyrazole.

*Example 14*

A mixture of 1'-phenyl- and 2'-phenyl-17α-ethynyl-17β-hydroxy - 4,9 - androstadieno-[3,2-c]pyrazole is obtained by the following route: A mixture of 1 gram of 17α-ethynyl - 17β - hydroxy - 2 - hydroxymethylene-4,9-androstadiene-3-one, 200 ml. of methanol, and 200 mg. of p-toluene-sulfonic acid is heated to reflux temperature and then allowed to stand at room temperature for one hour. The reaction mixture is then diluted with water and extracted with ethyl acetate. The ethyl acetate extract is washed two times with 2 N aqueous sodium hydroxide solution and then with water. The ethyl acetate extract is then dried and concentrated in vacuo. The 17α-ethynyl - 17β - hydroxy - 2 - methoxymethylene-4,9-androstadiene-3-one is obtained by chromatography on acid-washed alumina and elution with ether:chloroform mixtures.

A mixture of 500 mg. of the above 2-methoxy-methylene-derivative, 100 ml. of ethanol, and 1 ml. of phenylhydrazine is heated under nitrogen until dissolved, and then allowed to stand under nitrogen at room temperature over night. Acetic acid (2 ml.) is added and the reaction is allowed to stand for another 4 hours. The reaction mixture is then diluted with ethyl acetate, washed two times with 2 N sulfuric acid, two times with 2.5 N sodium hydroxide, and then two times with water. The ethyl acetate extract is then dried, concentrated, and chromatographed on acid-washed alumina to afford the 1'-phenyl- and the 2'-phenyl-17α-ethynyl-17β-hydroxy-4,9-androstadieno-[3,2-c]pyrazole.

In accordance with the above procedures, but using methylhydrazine, cyclohexylhydrazine, p-tolylhydrazine, p - chlorophenylhydrazine, p - fluorophenylhydrazine, p-methoxyphenylhydrazine, or benzylhydrazine in place of phenylhydrazine, there are obtained the corresponding 1'- and 2'-methyl-, 1'- and 2'-cyclohexyl-, 1'- and 2'-p-tolyl-, 1'- and 2'-p-chlorophenyl, 1'- and 2'-p-fluorophenyl-, 1'- and 2'-p-methoxyphenyl-, and 1'- and 2'-benzyl-17β-hydroxy - 17α - ethynyl - 4,9-androstadieno-[3,2-c]pyrazoles.

In accordance with the above procedures, but starting with 17α-trifluoropropynyl-17β-hydroxy-2-hydroxymethylene-4,9-androstadiene-3-one and using phenylhydrazine, methylhydrazine, cyclohexylhydrazine, p - tolylhydrazine, p - chlorophenylhydrazine, p - fluorophenylhydrazine, p-methoxyphenylhydrazine, or benzylhydrazine, there are obtained the corresponding 1'-and 2'-methyl-, 1'- and 2'-cyclohexyl-, 1'- and 2'-p-tolyl-, 1'- and 2'-p-chlorophenyl-, 1'- and 2'-p-fluorophenyl-, 1'- and 2'-p-methoxyphenyl-, and 1'- and 2'-benzyl-17α-trifluoropropynyl-17β-hydroxy-4,9-androstadieno-[3,2-c]pyrazoles.

In accordance with the above procedures, but starting with 17α-chloroethynyl-, 17α-bromoethynyl-, or 17α-fluoroethynyl - 17β - hydroxy - 2 - hydroxymethylene-4,9-androstadiene-3-one, and using phenylhydrazine, methylhydrazine, cyclohexylhydrazine, p-tolylhydrazine, p-chlorophenylhydrazine, p-fluorophenylhydrazine, p-methoxyphenylhydrazine, or benzylhydrazine there are obtained the corresponding 1'- and 2'-methyl-, 1'- and 2'-cyclohexyl-, 1'- and 2'-p-tolyl-, 1'- and 2'-p-chlorophenyl-, 1'- and 2'-p-fluorophenyl-, 1'- and 2'-p-methoxyphenyl-, and 1'- and 2'-benzyl-17α-chloroethynyl-, 17α-bromoethynyl-, or 17α-fluoroethynyl-17β-hydroxy-4,9-androstadieno-[3,2-c]pyrazoles.

Various changes and modifications may be made in carrying out the present invention without departing from the spirit and scope thereof. Insofar as these changes and modifications are within the purview of the annexed claims, they are to be considered as part of my invention.

I claim:
1. A compound selected from the group of compounds having structural Formulas A and B:

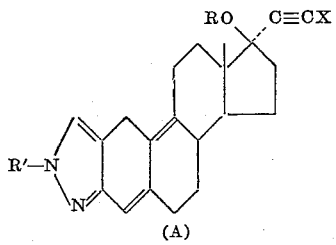

(A)

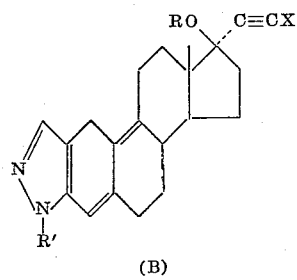

(B)

wherein X is a member of the group consisting of hydrogen, halogen or the trifluoromethyl group, R is a member of the group consisting of hydrogen, alkyl or lower hydrocarbon carboxylic acyl, and R' is a member of the group consisting of hydrogen, lower hydrocarbon carboxylic acyl, alkyl, cycloalkyl, aryl or aralkyl.

2. 17α-ethynyl-17β-hydroxy-2-hydroxymethylene - 4,9-androstadiene-3-one.
3. 17α-ethynyl-17β-hydroxy-4,9-androstadieno-[3,2 - c] pyrazole.
4. 17α-chloroethynyl-17β-hydroxy-2 - hydroxymethylene-4,9-androstadiene-3-one.
5. 17α-chloroethynyl-17β-hydroxy-4,9 - androstadieno-[3,2-c]pyrazole.
6. 17α-trifluoropropynyl-17β-hydroxy-2-hydroxymethylene-4,9-androstadiene-3-one.
7. 17α-trifluoropropynyl-17β-hydroxy-4,9-androstadieno-[3,2-c]pyrazole.
8. 17α-ethynyl-17β-hydroxy-2'-methyl-4,9 - androstadieno-[3,2-c]pyrazole.
9. 2'-cyclohexyl-17α-ethynyl-17β-hydroxy-4,9 - androstadieno-[3,2-c]pyrazole.
10. 17α-ethynyl-17β-hydroxy-2'-phenyl-4,9 - androstadieno-[3,2-c]pyrazole.
11. 17α-chloroethynyl-2'-(p-chlorophenyl) - 17β - hydroxy-4,9-androstadieno-[3,2-c]pyrazole.
12. 17α-bromoethynyl-17β-hydroxy-2' - (p - methoxyphenyl)-4,9-androstadieno-[3,2-c]pyrazole.
13. 17α-trifluoropropynyl-17β-hydroxy-2'-(p-tolyl)-4,9-androstadieno-[3,2-c]pyrazole.
14. 2'-benzyl-17α-trifluoropropynyl-17β-hydroxy - 4,9-androstadieno-[3,2-c]pyrazole.
15. 17α-trifluoropropynyl-2'-(p-fluorophenyl)-17β - hydroxy-4,9-androstadieno-[3,2-c]pyrazole.
16. N-lower hydrocarbon carboxylic acyl-17β-acyloxy-17α-trifluoropropynyl-4,9-androstadieno-[3,2-c]pyrazole.
17. 17α-ethynyl-17β-methoxy-2-hydroxymethylene-4,9-androstadieno-3-one.
18. 17α-ethynyl-17β-methoxy-4,9-androstadieno-[3,2-c]pyrazole.

References Cited in the file of this patent
UNITED STATES PATENTS
2,945,852   Bergstrom _____ July 19, 1960